United States Patent [19]

Atkinson et al.

[11] 4,134,561

[45] Jan. 16, 1979

[54] SOUND SUPPRESSING ENGINE MOUNTING MEANS

[75] Inventors: David W. Atkinson; Donald A. Kuntz; William L. Sprick, all of Peoria, Ill.

[73] Assignee: Caterpillar Tractor Co., Peoria, Ill.

[21] Appl. No.: 788,854

[22] Filed: Apr. 19, 1977

[51] Int. Cl.² .......................... F16M 5/00; F16F 15/00
[52] U.S. Cl. ................................. 248/632; 248/358 R; 248/669
[58] Field of Search .................. 248/7, 8, 9, 10, 22, 248/24, 358 R

[56] References Cited

U.S. PATENT DOCUMENTS

| 1,754,308 | 4/1930 | Cowell et al. | 248/22 |
| 1,857,168 | 5/1932 | Steiner et al. | 248/9 |
| 2,167,577 | 7/1939 | Klemm | 248/9 X |
| 2,215,743 | 9/1940 | Saurer | 248/9 X |
| 2,463,059 | 3/1949 | Saurer | 248/22 |
| 2,547,075 | 4/1951 | Cook | 248/24 |
| 2,638,303 | 5/1953 | Pietz | 248/22 X |
| 2,828,589 | 4/1958 | Hercik | 248/24 UX |
| 3,167,294 | 1/1965 | Andrews et al. | 248/358 R |
| 3,448,949 | 6/1969 | Kelley | 248/22 X |

FOREIGN PATENT DOCUMENTS

| 1410353 | 7/1964 | France | 248/22 |
| 1484436 | 6/1966 | France | 248/22 |
| 282188 | 12/1927 | United Kingdom | 248/9 |

*Primary Examiner*—J. Franklin Foss
*Attorney, Agent, or Firm*—John L. James

[57] ABSTRACT

An engine having attaching elements is mounted by the apparatus of this invention on a frame with the engine load being carried by resilient sound isolating elements contacting flanges of a movable spool. A metal-to-metal contacting pathway cannot be followed from the engine to the frame.

11 Claims, 3 Drawing Figures

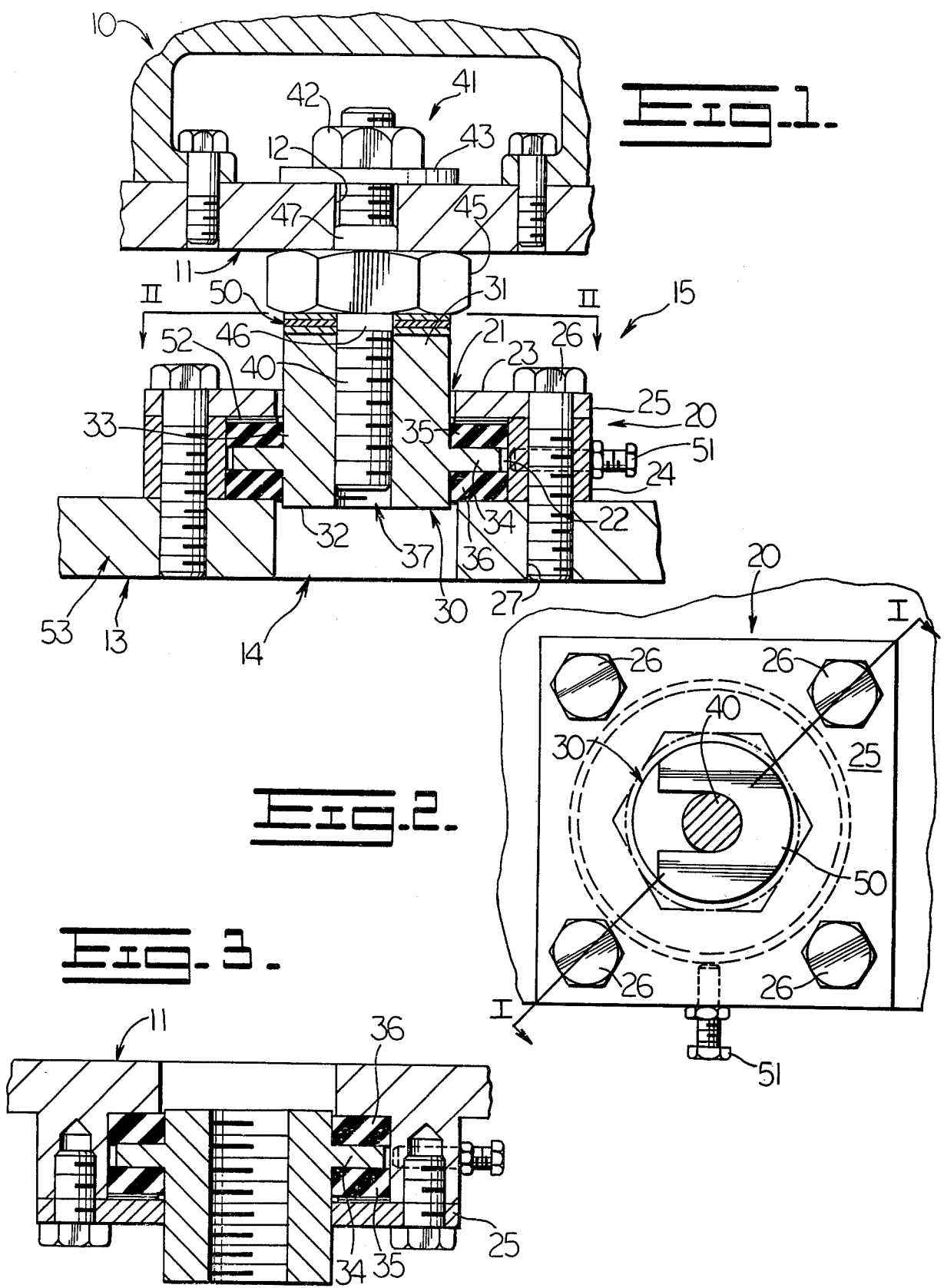

SOUND SUPPRESSING ENGINE MOUNTING MEANS

BACKGROUND OF THE INVENTION

In the mounting of engines on a frame of a vehicle, for example, a pathway of metal-to-metal contact can generally be followed from the engine to the frame. This is particularly true where the engine is of relatively heavy weight. The noise emitted from the apparatus combination is therefore greater than desirable.

The present invention is directed to overcoming one or more of the problems as set forth above.

According to the present invention, an apparatus is provided for mounting an engine having attaching means having an opening on a frame having a frame opening. A preselected one of said attaching means or frame has a housing having a central opening and a chamber. A spool having an outwardly extending flange extends through and being spaced from the housing of the preselected attaching means or frame to which the housing is associated. The spool is movably positioned within the housing chamber.

First and second sound isolating elements are each positioned within the housing chamber on an opposed side of the spool flange. A threaded shaft extends from the spool and through the opening of said other attaching means or frame. A supporting member is connected to the threaded shaft in supporting contact with said other attaching means or frame. Spacer means is positioned between the supporting member and spool and is maintained in forcible contact with the spool by the support member.

BRIEF DESCRIPTION OF THE DRAWINGS

FIG. 1 is a diagrammatic frontal view in partial section of the apparatus of this invention;

FIG. 2 is a diagrammatic plane view of a portion of the apparatus of FIG. 1; and FIG. 3 is a diagrammatic partial view of a unitary housing connected to the attaching means.

DETAILED DESCRIPTION

Referring to FIG. 1, an engine 10 of a work vehicle, boat engine or a crawler tractor, has an engine attaching means 11, for example a mounting bracket, having an opening 12 extending therethrough. A frame 13 of the vehicle has an opening 14 for connecting the engine 10 to the frame 13 by the apparatus of this invention 15.

The apparatus 15 has a housing 20 which has a central opening 21 and a chamber 22. The central opening 21 at the first end 23 of the housing 20 is preferably of a size substantially common with the frame opening 14 or attaching means opening 11 to which the housing 20 is expected to be attached.

The apparatus of this invention can have its housing 20 attached to the attaching means 11 (FIG. 3) or the frame 13 (FIG. 1) with the associated elements attached to the other of said attaching means 11 or frame 13 as is obvious from a study of the drawings. For purposes of clarity and brevity, the housing 20 will be described as being attached to the frame 13 with associated elements attached to the attaching means 11 (FIG. 1). The housing 20 can also be a unitary portion of the frame 13 or attaching means 11.

The housing 20 preferably is formed of two pieces comprising a sidewall member 24 and a removable cap member 25. The cap member 25 is removably attached to the sidewall member 24 and the frame 13 by bolts 26 extending through the sidewall and cap members 24, 25 and mateable with the threaded openings 27 of the frame 13.

A spool 30 is movably positioned in the housing 20. The spool has first and second end portions 31, 32 and a middle portion 33. A spool flange 34 extends outwardly from the middle portion 33 of the spool 30. Preferably, the flange 34 is an annular flange and extends past the central opening 21 of the housing 20 a preselected distance into the housing chamber 22 and terminates at a location spaced from the housing sidewall member 24.

The spool first and second end portions 31, 32 are of a size sufficient for passing through and being spaced from the central opening 21 of the housing 20, as defined by the cap member 25 and the frame opening 14. The spool 30 can be multisided, circular, as shown, or of other cross sectional configurations. The spool 30 is also of a length sufficient for positioning the spool first end portion 31 spaced outwardly from the housing cap member 25 and the spool second end portion 32 extending into the frame opening 14 in the installed position of the spool 30 in the housing 20.

First and second resilient, sound isolating elements 35, 36 for example rubber elements, are each positioned within the housing chamber 22 on an opposed side of the spool flange 34. Preferably, the elements 35, 36 are each of a rectangular configuration and of a size sufficient for compressing the elements 35, 36 a preselected value in response to installing the housing 20 by bolts 26. The elements 35, 36 can be of substantially equal thickness or of differing thickness as indicated by the engine weight to be supported thereby. Where, for example, relatively heavy loads are to be placed on the elements 35, 36, the lowermost element, here 36, might be desirably thicker than element 35 and formed of material having a greater compression coefficient.

A threaded shaft 40 extends from the first end portion 31 of the spool 30, through the actuating means opening 12, and outwardly to a location spaced from the attaching means 11. The shaft 40 is preferably fixedly connected to the spool 30 by threads of the shaft mating with threads of an opening 37 of the spool 30. Means 41, such as nut 42 and washer 43, are connected to the outer end of the shaft 40 for maintaining the engine attaching means 11 against outwardly directed movement relative to the shaft 40.

A supporting member 45 of shaft 40 is connected to the middle portion 46 of the shaft 40 at a location between the first end portion 31 of spool 30 and the engine attaching means 11. The member 45 is of a size greater than the attaching means opening 12 and is in supporting contact with the attaching means 11 in the installed position. In order to achieve proper alignment of the engine 10 and frame 13 by the apparatus 15, the supporting member 45 preferably has a protrusion 47 extending into the attaching means opening 12.

Referring to FIG. 2, spacer means 50, for example elements of a general "U" configuration having an inside diameter greater than the diameter of shaft 40 for straddling said shaft 40 in the installed position, is positioned between the lower portion of threaded supporting member 45 and the first end portion 31 of spool 30. In the installed position of the apparatus, the spacer means 50 is maintained in forcible contact with the first end portion 31 of the spool by the lower portion of threaded supporting member 45.

In operation of the apparatus, the sound suppressing, isolating element 36 and 35 are positioned on the spool 30 and these three elements are inserted into housing 20. The cap member 25 is connected which compresses the elements 35, 36 to a reduced thickness of, for example, 20% of the original thickness. This compressing of elements 35, 36 functions to fill the chamber 22 and axial position and maintain the spool 30. If compression is less than desired, shims 52 can be utilized.

Prior to attaching cap member 25, set screw 51 can be moved to assure flange 34 free from metal-to-metal contact and to further facilitate the alignment of the engine. The set screw 51 is thereafter backed off from contact with the flange 34. The attachaing means 11 is then inserted over the shaft and protrusion 47 and the supporting member 45 is rotated to desirably position the engine at a preselected height for leveling the engine. The supporting member 45 is then moved a short distance toward the engine and a sufficient number of spacing means 50 are inserted to support the supporting member 45 at the engine level position. The supporting member 45 is then moved toward the frame 13 to urge the spacing means 50 into forcible contact with the first end portion 31 of the spool 30. At this position, the engine load is being carried through the spacing means 50 to the spool 30 and onto the elements 35, 36 via the flange 34 as opposed to being carried through the threads of the shaft 40 and associated elements. The sound suppressing, isolating elements 35, 36 thereby provide a connection without metal-to-metal contact and are restrained by the housing 20 which provides a rugged construction. The engine can therefore move in any direction and impact the connection with the forces of the movement being carried and absorbed solely by the elements 35, 36 owing to the absence of a metal-to-metal pathway between the engine and the frame.

Other aspects, objects, and advantages of this invention can be obtained from a study of the drawings, the disclosure, and the appended claims.

The embodiments of the invention in which an exclusive property or privilege is claimed are defined as follows:

1. Apparatus for mounting an engine on a frame having a frame opening, said engine having attaching means with an opening therein, comprising:
   a preselected one of said attaching means and frame having a housing having a central opening and a chamber;
   a spool having an outwardly extending flange, said spool being spaced from and extending through the housing and into the opening of the preselected one of the attaching means and frame to which the housing is associated, said flange being spaced from the housing walls and movably positioned within said housing chamber;
   first and second resilient sound isolating elements each positioned within the housing chamber on an opposed side of the spool flange;
   a threaded shaft extending from the spool and through the opening of the other of said attaching means and frame;
   a threaded supporting member mateably connected to the threaded shaft between the attaching means and spool and in supporting contact with said other of the attaching means and frame, said supporting member having a protrusion of a construction sufficient for extending into the opening of said other of the attaching means and frame, and
   spacer means positioned between the supporting member and spool and being maintained in forcible contact with the spool by said support member for positioning the engine at a preselected location and supporting the supporting member by the spool through said spacer means.

2. Apparatus as set forth in claim 1, including a cap member removably connected to the preselected one of the attaching means and frame and extending over the housing chamber, said cap member being removable without disturbing the spool.

3. Apparatus, as set forth in claim 1, wherein the threaded shaft is mated with threads of an opening of the spool.

4. Apparatus, as set forth in claim 1, wherein the resilient sound isolating elements are each of a rectangular configuration.

5. Apparatus, as set forth in claim 4, wherein the resilient sound isolating elements are formed of rubber and are each of a size sufficient for being compressed a preselected amount in the installed position.

6. Apparatus, as set forth in claim 1, including: means associated with said support member for maintaining the engine attaching means at a preselected loction relative to the threaded shaft.

7. Apparatus, as set forth in claim 1, wherein the spacer means are of a generally "U" configuration having an inside diameter greater than the threaded shaft for straddling said shaft in the installed position.

8. Apparatus, as set forth in claim 1, wherein the threaded support member includes a protrusion of a size sufficient for extending into the attaching means opening.

9. Apparatus, as set forth in claim 1, wherein the spool flange is an annular flange.

10. Apparatus, as set forth in claim 1, wherein the spool, resilient sound isolating elements, threaded shaft, and support element are substantially coaxial with the axis of the chamber in the installed position.

11. Apparatus, as set forth in claim 1, including a cap member removably connected to the preselected one of the attaching means and frame and extending over the housing chamber; and
   a spacer positioned between the cap member and first sound isolating element, said spacer being free of metal to metal contact with the spool.

* * * * *